April 7, 1942.   D. L. CLIFFORD   2,279,108
DEVICE FOR APPLYING CHAINS TO TIRES
Filed Oct. 31, 1939
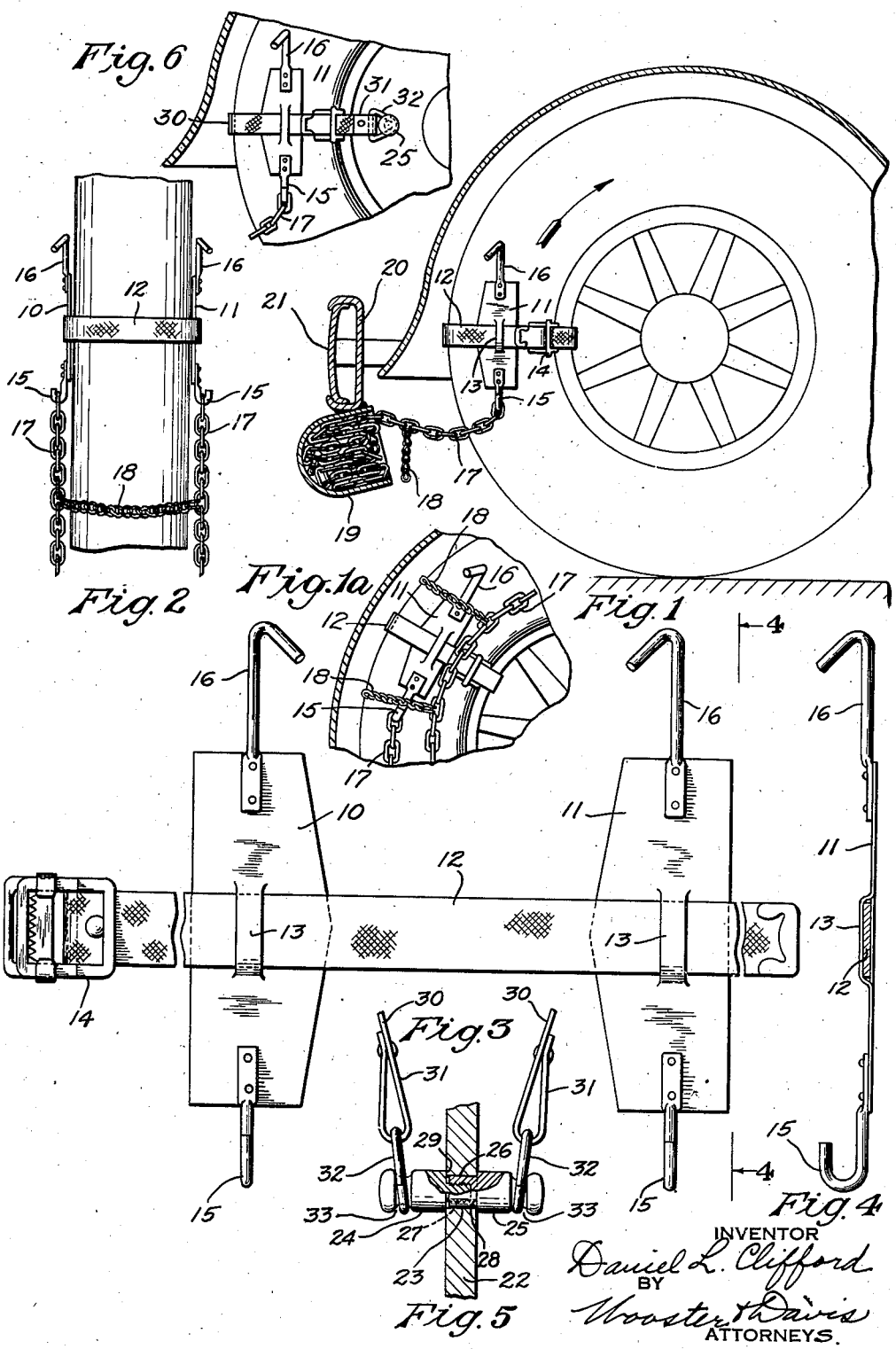
INVENTOR
Daniel L. Clifford
BY
Wooster & Davis
ATTORNEYS.

Patented Apr. 7, 1942

2,279,108

UNITED STATES PATENT OFFICE 2,279,108

DEVICE FOR APPLYING CHAINS TO TIRES

Daniel L. Clifford, Bridgeport, Conn.

Application October 31, 1939, Serial No. 302,070

5 Claims. (Cl. 81—15.8)

This invention relates to a device for applying anti-skid tire chains to tires, and has for an object to provide a simple, effective and easily operated device for applying such chains to a tire.

It has also for an object to provide a means by which such chains may be applied to a tire without difficulty in almost any location, either in a garage or on the road, or when the car may be in a difficult location such as in a snow bank, on a slippery pavement or in a rut or the like.

With the foregoing and other objects in view I have devised the construction illustrated in the accompanying drawing forming a part of this specification. It will, however, be understood that various changes and modifications may be employed within the scope of the invention.

In this drawing:

Fig. 1 is a side elevation of an automobile wheel with mudguard and other elements in section showing how the device may be employed for applying a chain to a tire;

Fig. 1a is a side elevation of a portion of the wheel showing the position of the parts after the wheel has made a complete revolution from the position of Fig. 1.

Fig. 2 is an edge elevation of a portion of a tire and chain looking from the left of Fig. 1;

Fig. 3 is a plan view of the device;

Fig. 4 is a view substantially on line 4—4 of Fig. 3;

Fig. 5 is a partial section and partial elevation of a modified construction.

Fig. 6 is a side elevation of a portion of the wheel showing the modification of Fig. 5 applied thereto.

Considerable difficulty is often encountered in applying anti-skid chains to automobile tires, particularly in the modern cars where a great portion of the tire and wheel may be enclosed in the mudguards making the tire difficult of access and also reducing the available space for application of the chains. The present device greatly facilitates this application as it comprises a simple and effective means which may be clamped about the tire to which one end of the chain may be connected and then by rotation of the wheel the chain may be drawn about the tire into the desired position on the tread thereof and the ends easily attached, and this may be done even when the car is in a difficult location as on a slippery pavement or in snow and mud.

The device comprises a pair of metal plates 10 and 11 connected in properly spaced relation on a flexible connecting strap 12. The plates may be secured to the strap in various ways but I prefer to slit the plates at two spaced points and press laterally the strip as indicated at 13 under which the strap 12 may be threaded. This loop formed by strip 13 grips the strap sufficiently to hold the plates in proper position but permits adjustment of the plates along the strap if desired by forcing the plate along the strap. The strap may be of any suitable material such as heavy woven canvas, leather, or a combination of canvas and rubber, or other suitable material, and is of sufficient length to be clamped about the tire and rim as shown in Fig. 1 and held by any suitable means such as a suitable buckle 14. When so clamped about the tire the plates 10 and 11 are clamped against the opposite side surfaces of the tire and securely held in this position.

At one end of each of the plates 10 and 11, that is the lower end as shown in Fig. 1, when applied to the tire in the upright position, is a hook 15, and this hook is preferably mounted to extend outwardly away from the tire and at substantially right angles to the plane of the plate. At the opposite or upper end of each plate is another hook 16, the free end of which also extends outwardly away from the tire but is preferably at about an angle of 45° to the plane of the plate and with the free end of the hook extending toward the rim or tread of the tire as shown in Figs. 1 and 2.

In applying the chain after the device is clamped to the tire as shown in Fig. 1 to locate the plates 10 and 11 against the opposite side surfaces of the tire the ends or adjacent links of the side chains 17 are hooked over the lower hooks 15. Then if the wheel is rotated in the direction of the arrow the chain is drawn over the tire locating the side chains along the opposite ends of the tire and the cross chains 18 cross the rim or tread of the tire in the proper location. After the chain has been completely drawn onto the tire, the opposite ends of the side chains are connected in the usual manner and this applying device removed. Should, however, at the time of application the wheel be in a difficult location, such for example as a snow bank, the upper hooks 16 in a great majority of cases will automatically hook into the free ends of the side chains after it has been drawn around the tire and hold it sufficiently to bring the car out of the difficult location to a location more easily accessible to the chain or connection of the free ends of the side chains to each other and removal of the applying device. Fig. 1a shows this operation more clearly. In this figure the parts are shown in their positions after the wheel has made a complete revolution from the position of Fig. 1. It will be seen that the chain has been completely drawn onto the tire and that the free end portion of the side chain opposite to that secured to the hook 15 has passed over and is located below the hook 16. Therefore when the wheel makes another half revolution so that this free end portion of the chain is below the axis of the wheel and tends to fall away from the tire either the side chains 17 or the cross chain 18 will catch on the hook 16 and be held thereby. Or if the chains do not automatically hook on to the upper hook 16 it is very easy to hook the rear or free ends of the side chain onto these hooks 16 for a temporary application sufficient to permit bringing of the car to a more favorable location for connection of the free ends of the side chains.

The device may be used to draw the chain on to the tire from a position with the chain lying on the floor or pavement or it may be used to draw the chain from a suitable holder on the car, such for example as a bag or container 19 mounted on a suitable bracket 20 which may be temporarily attached to the bumper 21 to bring the open side of this container into alignment with the tire. This is particularly desirable should the wheel be in a difficult location or on a slippery pavement so that as the wheel is turned it tends to skid sidewise out of alignment with a chain lying on the pavement. With this container the chain is held in proper alignment with the tire while it is being drawn on to the tire so that it is laid on the tire in the proper straight position.

If the wheels are disc wheels with no slots through them for the application of emergency chains, these securing plates 10 and 11 could not be applied by a strap similar to that shown at 12 to be wrapped around the tire and rim. With this kind of a disc wheel a device similar to that of Fig. 5 may be used. In this case the disc of the wheel is shown at 22 and is provided with an opening 23 through it, which may be made by drilling or punching the disc. Then two studs 24 and 25 are secured on opposite sides of this disc. An effective means is to provide the stud 25 with a reduced portion 26 which is tapped to receive the threaded extension 27 on the stud 24. These can be threaded together from opposite sides of the disc with the shoulders 28 and 29 clamped against the opposite faces thereof. The plates 10 and 11 are mounted on a strap 30 taking the place of the strap 12 but threaded through the loops 13 in the same manner to pass over the tread of the tire and be secured by a buckle, the same as the buckle 14, but instead of passing around the inner side of the rim as shown in Fig. 1 the opposite ends have loops 31 secured to the links 32 adapted to be hooked over the ends of the studs 24 and 25 and seat in the grooves 33 therein as shown in Fig. 5. This will securely fasten the device to the wheel and tire and draw the chain on to the tire the same as the first form.

This device may be used equally as effective with the front and rear wheels and it will be evident it is a very simple construction which can be readily carried in the car and easily and quickly applied to the tire and wheel for drawing the chain quickly and easily into position and may be as easily removed after the chain is in place, and furthermore the double sets of hooks will temporarily secure the chain in difficult or inaccessible locations sufficiently so that the car may be removed from such location to a better and more favorable position for the complete or permanent location of the chain. The chain is applied without the use of a jack.

Having thus set forth the nature of my invention, what I claim is:

1. A device for applying chains to tires comprising a pair of plates adapted to be positioned one against each side of a tire, a flexible strap connecting said plates and adapted to pass over the tread of the tire to clamp the plates against the sides of the tire, a hook on each plate at one end thereof adapted to engage in side links at one end of a chain to pull it onto the tire on rotation of the wheel, and another hook at the other end of each plate adapted to engage a side link at the opposite end of the chain after the chain has been drawn about the tire.

2. A device for applying chains to tires comprising a pair of plates adapted to be positioned one against each side of a tire, a flexible strap connecting said plates and adapted to pass over the tread of the tire to clamp the plates against the sides of the tire, a hook on each plate at one end thereof and extending outwardly at substantially right angles to the plane of the plate adapted to engage in side links at one end of a chain to pull it onto the tire on rotation of the wheel, and another hook at the other end of each plate projecting outwardly and at approximately 45° to the plane of the plate adapted to engage a side link at the opposite end of the chain after the chain has been drawn about the tire.

3. A device for applying chains to tires comprising a pair of plates adapted to be positioned one against each side of a tire, each plate being slit at spaced parallel points and the strip between the slits being forced laterally to form a loop, a flexible strap threaded through the loops, the loops being sufficiently low to grip the strap to hold the plates in position but permit them to be forced along the strap for adjustment means adapted for securing the strap about the tread of the tire to secure the plates against the side surfaces of the tire, means on the plates adapted to engage links of side chains to draw the chain onto and over the tread on rotation of the wheel, and means on said plates adapted to engage links at the opposite end of the chain after the chain has been drawn about the tire to hold it on the tire.

4. A device for applying chains to tires comprising a substantially rigid supporting means adapted to be positioned at each side of a tire, means to secure said first means at the sides of the tire, a hook on said supporting means at each side of the tire adapted to engage in a link of the side chains to pull the chain onto the tire on rotation of the wheel, and other hooks on said first means forwardly of the first hooks and held rigid on the supporting means in position so that links at the opposite end of the chain may pass over these second hooks after the chain has been drawn about the tire and be engaged and held thereby.

5. A device for applying chains to tires comprising supporting means adapted to be positioned at each of the opposite sides of a tire, means for securing said means at the sides of the tire, means on said supporting means at each side of the tire adapted to engage links of side chains to draw the chain onto and over the tread on rotation of the wheel, and substantially rigid link engaging means on said supporting means positioned forwardly of said first mentioned link engaging means so that links at the opposite end of the chain as the wheel rotates after the chain has been drawn about the tire may pass over said second link engaging means and be engaged thereby to retain said latter end portion on the tire.

DANIEL L. CLIFFORD.